(12) United States Patent
Condra et al.

(10) Patent No.: US 9,300,989 B2
(45) Date of Patent: Mar. 29, 2016

(54) METHOD AND APPARATUS FOR REMOTE SOFTWARE DRIVEN REVERSE SEGMENTATION

(71) Applicant: Cisco Technology, Inc., San Jose, CA (US)

(72) Inventors: Steven Charles Condra, Suwanee, GA (US); Kevin Patrick Melvin, Tucker, GA (US); Daniel Lee Van Dyke, Sandy Springs, GA (US); Joby Mathew, Fairview, TX (US)

(73) Assignee: Cisco Technology, Inc., San Jose, CA (US)

( * ) Notice: Subject to any disclaimer, the term of this patent is extended or adjusted under 35 U.S.C. 154(b) by 49 days.

(21) Appl. No.: 14/048,090

(22) Filed: Oct. 8, 2013

(65) Prior Publication Data

US 2015/0101000 A1    Apr. 9, 2015

(51) Int. Cl.
| | |
|---|---|
| H04N 7/173 | (2011.01) |
| H04N 21/236 | (2011.01) |
| H04L 12/28 | (2006.01) |
| H04N 21/222 | (2011.01) |
| H04N 21/2385 | (2011.01) |
| H04N 21/239 | (2011.01) |
| H04N 21/24 | (2011.01) |
| H04N 21/61 | (2011.01) |

(52) U.S. Cl.
CPC .......... *H04N 21/236* (2013.01); *H04L 12/2801* (2013.01); *H04L 12/2861* (2013.01); *H04L 12/2867* (2013.01); *H04L 12/2872* (2013.01); *H04L 12/2885* (2013.01); *H04N 21/2221* (2013.01); *H04N 21/239* (2013.01); *H04N 21/2385* (2013.01); *H04N 21/2402* (2013.01); *H04N 21/2408* (2013.01); *H04N 21/6118* (2013.01); *H04N 21/6168* (2013.01)

(58) Field of Classification Search
CPC .......... H04N 21/6118; H04N 21/6168; H04N 7/17309; H04N 21/44209; H04N 21/238; H04N 21/23614; H04N 21/2365; H04N 21/2368
USPC .................................. 725/111, 116; 709/209
See application file for complete search history.

(56) References Cited

U.S. PATENT DOCUMENTS

| | | | |
|---|---|---|---|
| 7,085,287 B1 | 8/2006 | Chapman | |
| 7,397,846 B1 * | 7/2008 | Beser | 375/222 |
| 2003/0126610 A1 * | 7/2003 | Ando | 725/91 |
| 2007/0064593 A1 * | 3/2007 | Scale et al. | 370/216 |

(Continued)

FOREIGN PATENT DOCUMENTS

WO    2011021031 A1    2/2011

OTHER PUBLICATIONS

International Search Report dated Feb. 25, 2015 cited in Application No. PCT/US2014/059501, 11 pgs.

(Continued)

*Primary Examiner* — Oleg Asanbayev
(74) *Attorney, Agent, or Firm* — Merchant & Gould P.C.

(57) ABSTRACT

Reverse segmentation may be provided. First, a plurality of legs may be received and combined into a first service group. Next, it may be determined that a number of active user devices increased on at least one of the plurality of legs. A portion of the plurality of legs may then be switched from the first service group to a second service group in response to determining that the number of active user devices increased on the at least one of the plurality of legs.

20 Claims, 4 Drawing Sheets

(56) References Cited

U.S. PATENT DOCUMENTS

2010/0317387 A1   12/2010  O'Keeffe et al.
2011/0096819 A1    4/2011  Al-Banna et al.
2012/0093511 A1*   4/2012  Maricevic .................. 398/66
2012/0182871 A1    7/2012  Frieh et al.
2014/0165121 A1*   6/2014  Dang et al. ................. 725/109

OTHER PUBLICATIONS

Cisco uBR-MC3GX60V Broadband Processing Engine with Full DOCSIS 3.0 Support for the Cisco UBR10012 Universal Broadband Router, Jul. 3, 2012, pp. 1-8, http://www.cisco.com/c/en/us/products/collateral/video/ubr10000-series-universal-broadband-routers/data_sheet_c78-642540.pdf.

* cited by examiner

METHOD AND APPARATUS FOR REMOTE SOFTWARE DRIVEN REVERSE SEGMENTATION

TECHNICAL FIELD

The present disclosure relates generally to reconfiguring upstream service groups.

BACKGROUND

Data Over Cable Service Interface Specification (DOCSIS) is an international telecommunications standard that permits the addition of high-speed data transfer to an existing cable television (CATV) system. DOCSIS may be employed to provide Internet access over existing hybrid fiber-coaxial (HFC) infrastructure.

HFC is a telecommunications industry term for a broadband network that combines optical fiber and coaxial cable. It has been commonly employed globally by cable television operators since the early 1990s. The fiber optic network extends from the cable operators' master headend, sometimes to regional headends, and out to a neighborhood's hubsite, and finally to a coaxial cable node that serves anywhere from 25 to 2000 homes. A master headend will usually have satellite dishes for reception of distant video signals as well as Internet protocol (IP) aggregation routers. Some master headends also house telephony equipment for providing telecommunications services to the community.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Reverse segmentation may be provided. First, a plurality of legs may be received and combined into a first service group. Next, it may be determined that a number of active user devices increased on at least one of the plurality of legs. A portion of the plurality of legs may then be switched from the first service group to a second service group in response to determining that the number of active user devices increased on the at least one of the plurality of legs.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

User device may receive high speed data services, such as cable Internet or VoIP, from a network. While receiving these high speed data services, user devices on the network may receive data from a headend. In addition, the user devices send data back to the headend. The data sent back to the headend from the user devices may comprise upstream data traffic.

Bandwidth may be allocated to a plurality of user devices for the upstream data traffic. The plurality of user devices may share this allocated bandwidth. A plurality of user devices that share allocated bandwidth for upstream data traffic may comprise a service group. For example, a 100 Mb/s pipe may be allocated to a service group comprising 25 user devices. In this case, each of the 25 user devices in the service group may be allocated 4 Mb/s of the pipe. If there were 50 user devices in the service group, each user device may be allocated 2 Mb/s of the pipe.

Service Groups sizes may need to be changed (e.g. reduced) due to increases in traffic and limitations on bandwidth. Changes to service group size can be expensive with additional hardware, truck rolls, and labor. Making service groups too small can be expensive and reduce the effectiveness of other services like multicast and switching efficiency. Making service groups too large can lead to oversubscription of data services and reduced user experience.

Consistent with embodiments of the disclosure, reverse segmentation may be provided to adjust (e.g. reduce or increase) service group sizes. Reverse segmentation may be provided when needed and may be implemented dynamically via software thus reducing or eliminating labor costs and truck roll costs. Moreover, by performing reverse segmentation when needed, cable modem termination system (CMTS) and quadrature amplitude modulation (QAM) capacity may be licensed when needed and not before, thus reducing energy and licensing costs.

As described in greater detail below, each leg of a node may be independently frequency shifted and stacked onto a single reverse transmitter. A receiver at the headend may then unstack and down covert each radio frequency (RF) leg of the node to create a potential service group from each leg of the physical node. The output of the receiver may comprise multiple RF streams (e.g. four.) Each of these streams may be treated as a separate service group or combined to be more efficient with CMTS and QAM capacity. Embodiments of this disclosure may connect multiple RF inputs into an RF switch fabric and may allow any number of the RF streams to be combined or treated separately. A combiner switch consistent with embodiments of the disclosure may have N inputs and N outputs. All N inputs may be combined into one output (e.g. one service group). Or each of the N inputs may be passed through and the combiner switch may provide N outputs (e.g. N number of service groups). Or any number of legs can be combined between 1 and N to provide between 1 and N service groups. The combiner switch may be controlled remotely through software.

Each N output from the combiner switch may be hard wired into the input ports of the CMTS. Consistent with embodiments of the disclosure, the CMTS input ports may be activated through software when the software activates the output from the combiner switch. When a CMTS port is activated, the associated QAM channels may also be activated and automatically licensed to the service provider. Energy may be saved by activating CMTS ports when needed. Consequently, operational expenditures may be saved by avoided energy and QAM licensing costs.

Figure 1:
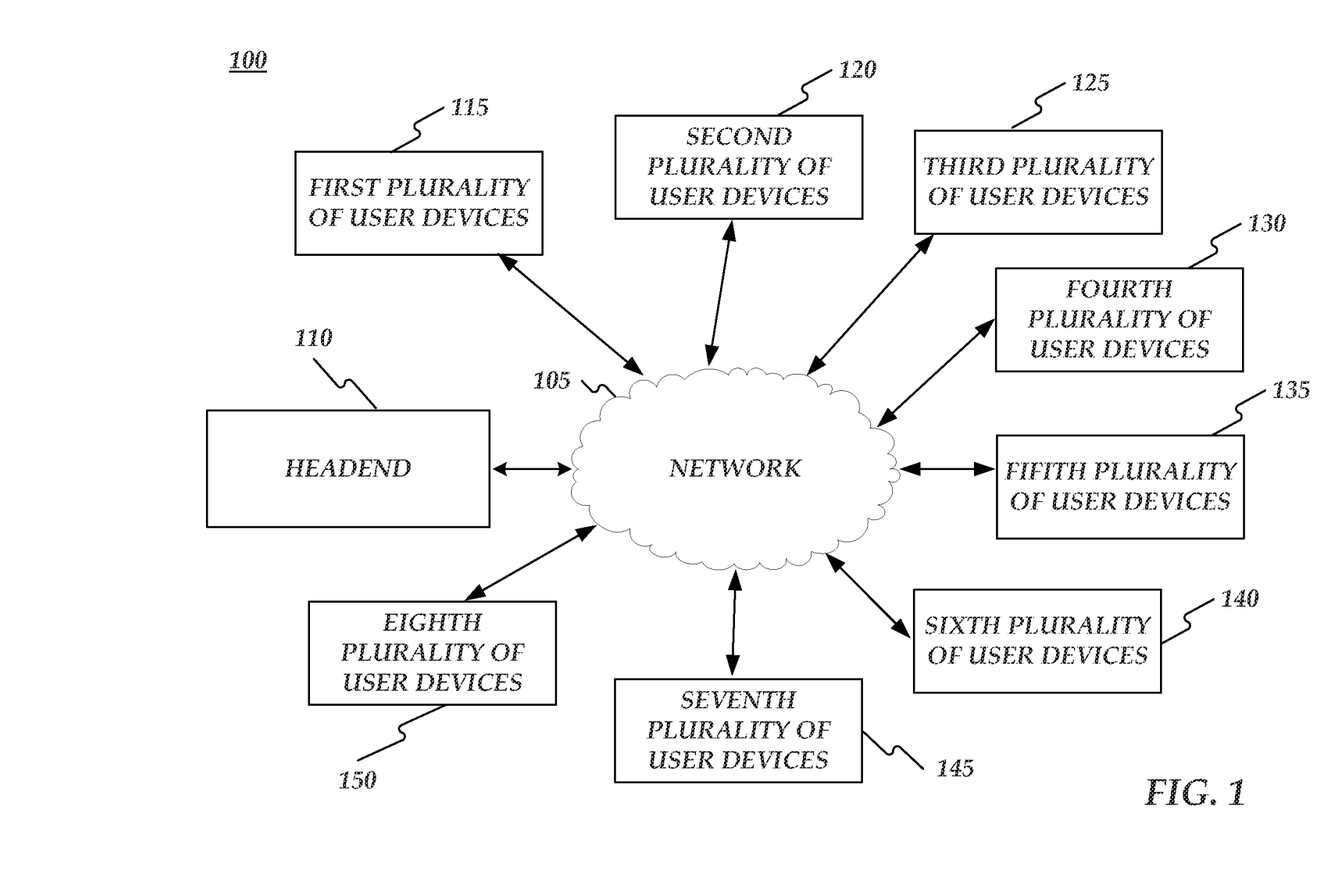
FIG. 1 is a block diagram of an operating environment for providing reverse segmentation in accordance with at least one example embodiment.

FIG. 1 is a block diagram of an operating environment 100 in accordance with at least one example embodiment. As shown in FIG. 1, operating environment 100 may comprise a network 105, a headend 110, and a plurality of user device groups. The plurality of user device groups may comprise a first plurality of user devices 115, a second plurality of user devices 120, a third plurality of user devices 125, a fourth plurality of user devices 130, a fifth plurality of user devices 135, a sixth plurality of user devices 140, a seventh plurality of user devices 145, and an eighth plurality of user devices 150. Network 105 may comprise any type of network (e.g., the Internet, a hybrid fiber-coaxial (HFC) network, a content delivery network (CDN), etc.). Headend 110 may comprise a cable television headend that may comprise a master facility for receiving content signals for processing and distribution over a cable television system such as network 105. Headend 110 is described in greater detail below with respect to FIG. 2.

Each of the plurality of user device groups may each comprise, for example, between 25 and 100 user devices. The plurality of user device groups, however, are not so limited and may comprise any number of user devices. Any of the aforementioned user devices may comprise a Digital Home Communication Terminal (DHCT) that may comprise, but is not limited to, a set-top box (STB), a digital video recorder, a cable modem, a personal computer, a Wi-Fi access point, a cellular base station, a switch servicing multiple clients in a vicinity, a tablet device, a mobile device, a smart phone, a telephone, a remote control device, a network computer, a mainframe, a router, or other similar device.

Figure 2:
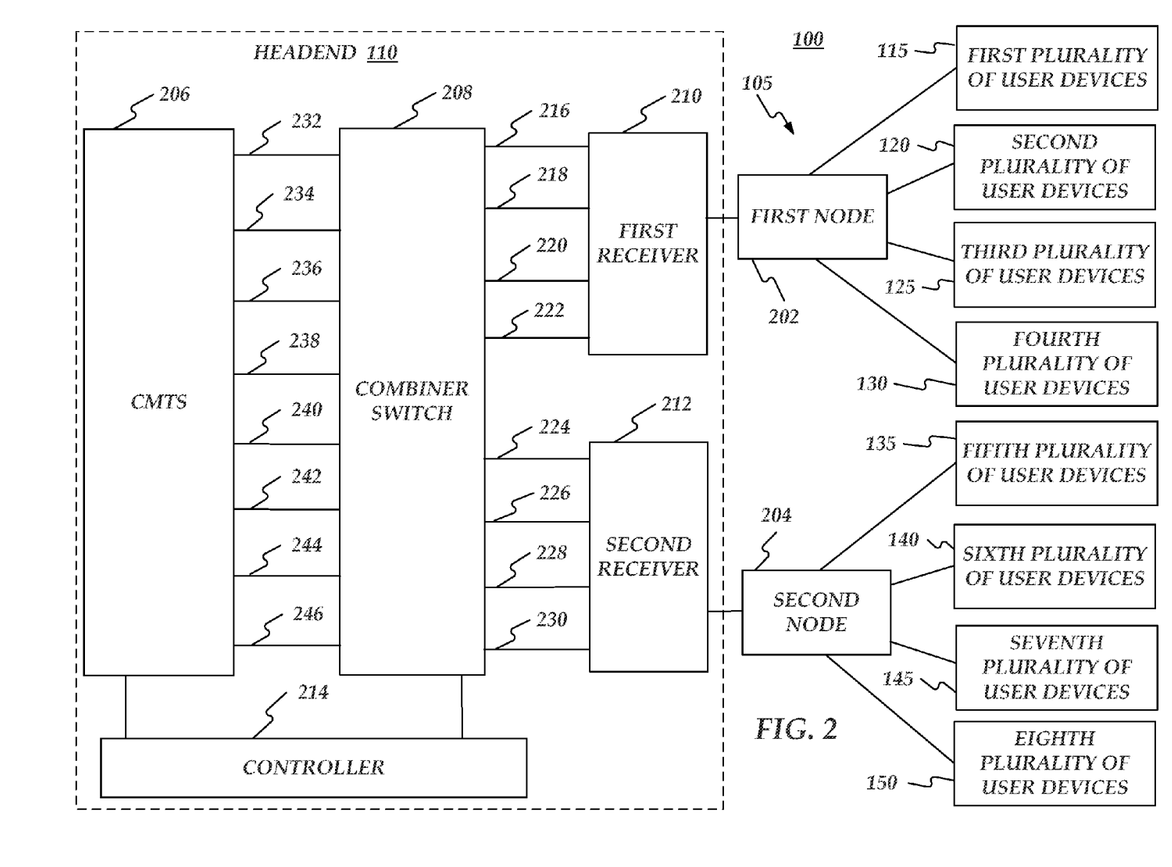
FIG. 2 is a block diagram of an operating environment for providing reverse segmentation in accordance with at least one example embodiment.

FIG. 2 is a block diagram of operating environment 100 in more detail consistent with embodiments of the disclosure. As shown in FIG. 2, network 105 may include a first node 202 and a second node 204. Headend 110 may comprise a Cable Modem Termination System (CMTS) 206, a combiner switch 208, a first receiver 210, a second receiver 212, and a controller 214. CMTS 206 may provide high speed data services, such as cable Internet or voice over Internet Protocol (VoIP), to users. Controller 214 may comprise a device capable of causing combiner switch 208 to perform reverse segmentation consistent with embodiments of the disclosure. For example, controller 214 may comprise a computing device 400 as described in greater detail below. In addition, combiner switch 208 and controller 214 may comprise separate devices or may be disposed in CMTS 206.

Consistent with embodiments of the disclosure, users operating user devices may wish to send data from their respective user devices to headend 110. Consequently, a user may use a user device in first plurality of user devices 115 to send upstream data traffic to first node 202. The upstream data traffic may comprise a video upload to a social media site or may be data requesting a channel change. The upstream data traffic may comprise any type of data being transmitted from the user device to headend 110. As shown in FIG. 2, first node 202 may service first plurality of user devices 115, second plurality of user devices 120, third plurality of user devices 125, and fourth plurality of user devices 130. Similarly, second node 204 may service fifth plurality of user devices 135, sixth plurality of user devices 140, seventh plurality of user devices 145, and eighth plurality of user devices 150.

First node 202 may receive the upstream data traffic from the user device in first plurality of user devices 115. Once received, first node 202 may up convert and radio frequency (RF) stack the upstream data traffic. First node 202 may then use a laser to transmit the upstream data traffic on a fiber to first receiver 210. Upstream data traffic from any of first plurality of user devices 115, second plurality of user devices 120, third plurality of user devices 125, and fourth plurality of user devices 130 may be transmitted from first node 202 to first receiver 210 in a similar way. Moreover, upstream data traffic from any of fifth plurality of user devices 135, sixth plurality of user devices 140, seventh plurality of user devices 145, and eighth plurality of user devices 150 may be transmitted from second node 204 to second receiver 212 in a similar way.

First receiver 210 may receive the upstream data traffic from the user device in first plurality of user devices 115 over the fiber between first receiver 210 and first node 202. First receiver 210 may use a photo diode to down convert and unstack the upstream data traffic thus converting the upstream data traffic back into an RF signal. First receiver 210 may then transmit the upstream data traffic to combiner switch 208. Similarly, first receiver 210 may transmit upstream data traffic to combiner switch 208 from other user devices in first plurality of user devices 115, second plurality of user devices 120, third plurality of user devices 125, and fourth plurality of user devices 130. For example, upstream data traffic from first plurality of user devices 115 may be transmitted from first receiver 210 to combiner switch 208 over a first receiver first leg 216. Upstream data traffic from second plurality of user devices 120 may be transmitted from first receiver 210 to combiner switch 208 over a first receiver second leg 218. In addition, upstream data traffic from third plurality of user devices 125 may be transmitted from first receiver 210 to combiner switch 208 over a first receiver third leg 220. Moreover, upstream data traffic from fourth plurality of user devices 130 may be transmitted from first receiver 210 to combiner switch 208 over a first receiver fourth leg 222. While first receiver 210 is shown to have four legs (e.g. first receiver first leg 216, first receiver second leg 218, first receiver third leg 220, and first receiver fourth leg 222) first receiver 210 is not so limited and may comprise any number of legs.

Similar to first receiver 210, second receiver 212 may transmit upstream data traffic to combiner switch 208. For example, second receiver 212 may transmit upstream data traffic to combiner switch 208 from user devices in fifth plurality of user devices 135, sixth plurality of user devices 140, seventh plurality of user devices 145, and eighth plurality of user devices 150. Upstream data traffic from fifth plurality of user devices 135 may be transmitted from second receiver 212 to combiner switch 208 over a second receiver first leg 224. Upstream data traffic from sixth plurality of user devices 140 may be transmitted from second receiver 212 to combiner switch 208 over a second receiver second leg 226. In addition, upstream data traffic from seventh plurality of user devices 145 may be transmitted from second receiver 212 to combiner switch 208 over a second receiver third leg 228. Moreover, upstream data traffic from eighth plurality of user devices 150 may be transmitted from second receiver 212 to combiner switch 208 over a second receiver fourth leg 230. While second receiver 212 is shown to have four legs (e.g. second receiver first leg 224, second receiver second leg 226, second receiver third leg 228, and second receiver fourth leg 230) second receiver 212 is not so limited and may comprise any number of legs.

Consistent with embodiments of the disclosure, upstream data traffic from respective ones of the plurality of user device groups may be organized into legs received at combiner switch 208. For example, upstream data traffic from first plurality of user devices 115, second plurality of user devices 120, third plurality of user devices 125, fourth plurality of user devices 130, fifth plurality of user devices 135, sixth plurality of user devices 140, seventh plurality of user devices 145, and eighth plurality of user devices 150 may respectively be organized into first receiver first leg 216, first receiver second leg 218, first receiver third leg 220, first receiver fourth leg 222, second receiver first leg 224, second receiver second leg 226, second receiver third leg 228, and second receiver fourth leg 230.

Combiner switch 208, under the control of controller 214, may organize and reorganize (e.g. switch) legs into one or more service groups (e.g. a first service group 232, a second service group 234, a third service group 236, a fourth service group 238, a fifth service group 240, a sixth service group 242, a seventh service group 244, and an eighth service group 246.) For example, first receiver first leg 216, first receiver second leg 218, first receiver third leg 220, first receiver fourth leg 222 may be organized into first service group 232. Then controller 214 may determine that the number of active user devices increased in at least one of the user device groups corresponding to the legs currently comprising first service group 232. In response, controller 214 may switch a portion of first service group 232's legs from first service group 232 to second service group 234. Furthermore, embodiments of the disclosure may also switch legs from a service group and deactivate the service group when the number of active user devices in the service group is below a predetermined threshold and the legs can be switched to another server group without over burdening the other service group.

Figure 3:
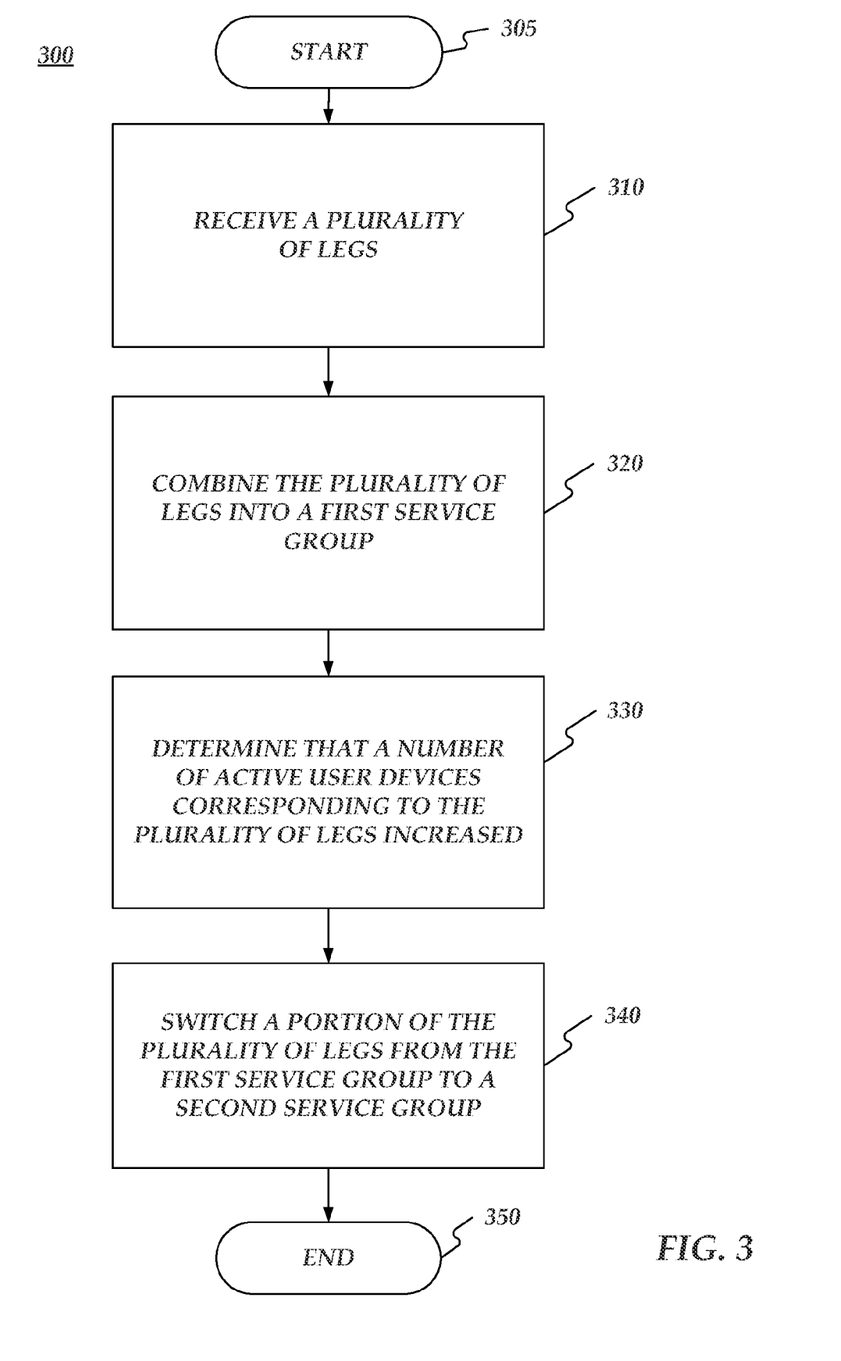
FIG. 3 is a flow chart of a method for providing reverse segmentation in accordance with at least one example embodiment.

FIG. 3 is a flow chart setting forth the general operations involved in a method 300 consistent with an embodiment of the disclosure for providing reverse segmentation. Method 300 may be implemented using a combination of controller 214 and combiner switch 208. Controller 214 may be embodied in computing device 400 as described in more detail below with respect to FIG. 4. Ways to implement the operations of method 300 will be described in greater detail below. As will be described below, method 300 may allow for remotely reconfiguring upstream service groups into more efficient sizes for traffic optimization.

At operation 310 of method 300, combiner switch 208 may receive a plurality of legs (e.g. first receiver first leg 216, first receiver second leg 218, first receiver third leg 220, first receiver fourth leg 222, second receiver first leg 224, second receiver second leg 226, second receiver third leg 228, and second receiver fourth leg 230). For example, the outputs from first receiver 210 and second receiver 212 may be wired into the input ports of combiner switch 208.

First receiver 210 may receive the upstream data traffic from the user devices in first plurality of user devices 115, second plurality of user devices 120, third plurality of user devices 125, and fourth plurality of user devices 130 over the fiber between first receiver 210 and first node 202. First receiver 210 may use a photo diode to down convert and unstack the upstream data traffic thus converting the upstream data traffic back into an RF signal. First receiver 210 may then transmit the upstream data traffic to combiner switch 208.

Similarly, second receiver 212 may receive the upstream data traffic from the user devices in fifth plurality of user devices 135, sixth plurality of user devices 140, seventh plurality of user devices 145, and eighth plurality of user devices 150 over the fiber between second receiver 212 and second node 204. Second receiver 212 may use a photo diode to down convert and unstack the upstream data traffic thus converting the upstream data traffic back into an RF signal. Second receiver 212 may then transmit the upstream data traffic to combiner switch 208.

At operation 320 of method 300, combiner switch 208 may combine the plurality of legs into first service group 232. Combiner switch 208, under the control of controller 214, may organize (e.g. switch) legs into one or more service groups (e.g. first service group 232, second service group 234, third service group 236, fourth service group 238, fifth service group 240, sixth service group 242, seventh service group 244, and eighth service group 246.) For example, first receiver first leg 216, first receiver second leg 218, first receiver third leg 220, and first receiver fourth leg 222 may each respectively have 25 active user devices on them. Consequently, the combined number of active user devices on these four legs may be 100 active user devices. Accordingly, first receiver first leg 216, first receiver second leg 218, first receiver third leg 220, first receiver fourth 222 leg may be organized into first service group 232 having a total of 100 active user devices.

At operation 330 of method 300, controller 214 may determine that the number of active user devices corresponding to the plurality of legs increased. For example, IP addresses for each user device in operating environment 100 may be geographically mapped to an input port on first node 202 or second node 204 and thus viewable by headend 110. Controller 214 may sense and may be aware when each user device in operating environment 100 is active.

Controller 214, for example, may sense that first receiver first leg 216 and first receiver fourth leg 222 may each respectively have 25 active user devices on them. However, controller 214, may further sense that first receiver second leg 218 and first receiver third leg 220 may each respectively have 75 active user devices on them. Consequently, the combined number of active user devices on these four legs may be 200 active user devices, a net increase of 100 active user devices. Accordingly, now first service group 232 has 200 active user devices. There may be a predetermined threshold of 100 active user devices, for example, for any given service group. Therefore, in this example, first service group 232 has exceeded its number of active user devices by 100.

Controller 214 may switch a portion of the plurality of legs from first service group 232 to second service group 234 at operation 340 of method 300. For example, first service group 232 has now exceeded its number of active user devices by 100. In response, controller 214 may cause combiner switch 208 to move legs assigned to first service group 232 to other service groups when first service group 232 has exceeded its predetermined threshold of active user devices. In this case, combiner switch 208 may activate second service group 234 and move first receiver first leg 216 and first receiver second leg 218 to second service group 234 and leave first receiver third leg 220 and first receiver fourth leg 222 on first service group 232. Accordingly first service group 232 and second service group 234 may now each have 100 active user devices and be within the predetermined threshold.

Consistent with embodiments of the disclosure, when controller 214 causes combiner switch 208 to activate second service group 234, controller 214 may also cause corresponding input ports on CMTS 206 to be activated. When the corresponding input ports are activated on CMTS 206, associated QAM channels may also be activated and automatically licensed to the service provider. Energy may be saved by waiting to activate the corresponding input ports on CMTS 206 once needed. Consequently, money may be saved by avoided energy and QAM licensing costs until second service group 234 is needed and activated.

An embodiment consistent with the disclosure may comprise a system for providing reverse segmentation. The system may comprise a memory storage and a processing unit coupled to the memory storage. The processing unit may be operative to receive a plurality of legs and combine the plurality of legs into a first service group. In addition, the processing unit may be operative to determining that a number of active user devices corresponding to the plurality of legs increased. Moreover, the processing unit may be operative to switch a portion of the plurality of legs from the first service group to a second service group in response to determining that the number of active user devices corresponding to the plurality of legs increased.

Another embodiment consistent with the disclosure may comprise a system for providing reverse segmentation. The system may comprise a memory storage and a processing unit coupled to the memory storage. The processing unit may be operative to determine that a number of active user devices corresponding to a plurality of legs associated with a first service group increased above a predetermined threshold. In addition, the processing unit may be operative to switch a portion of the plurality of legs from the first service group to a second service group in response to determining that the number of active user devices corresponding to the plurality of legs increased above the predetermined threshold.

Yet another embodiment consistent with the disclosure may comprise a system for providing reverse segmentation. The system may comprise a memory storage and a processing unit coupled to the memory storage. The processing unit may be operative to determine that a number of active user devices corresponding to a plurality of legs associated with a first service group increased above a predetermined threshold. Moreover, the processing unit may be operative to switch a portion of the plurality of legs from the first service group to a second service group in response to determining that the number of active user devices corresponding to the plurality of legs increased above the predetermined threshold. Furthermore, the processing unit may be operative to notify a CMTS that the portion of the plurality of legs were switched from the first service group to the second service group.

Figure 4:
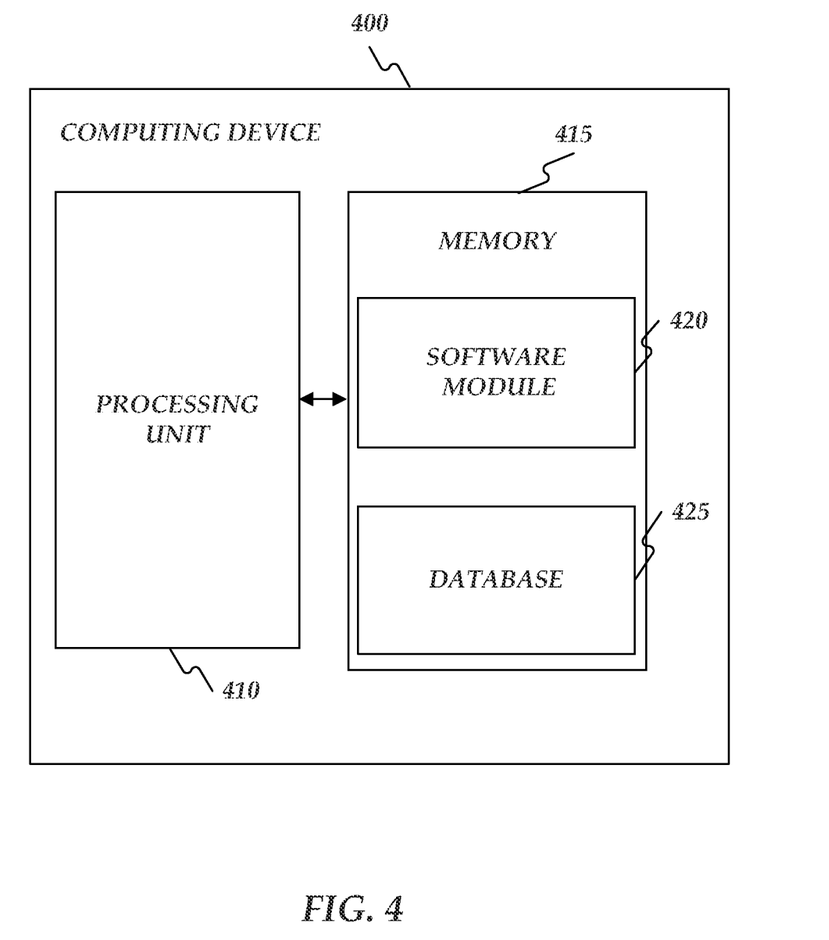
FIG. 4 is a block diagram of a computing device in accordance with at least one example embodiment.

FIG. 4 shows a computing device 400. As shown in FIG. 4, computing device 400 may include a processing unit 410 and a memory unit 415. Memory unit 415 may include a software module 420 and a database 425. While executing on processing unit 410, software module 420 may perform processes for providing reverse segmentation, including for example, any one or more of the stages from method 300 described above with respect to FIG. 3. Computing device 400, for example, may provide an operating environment for controller 214. Controller 214 may operate in other environments and is not limited to computing device 400.

Computing device 400 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. Furthermore, computing device 400 may comprise, for example, a mobile terminal, such as a smart phone, a cellular telephone, a cellular telephone utilizing Wireless Application Protocol (WAP) or unlicensed mobile access (UMA), personal digital assistant (PDA), intelligent pager, portable computer, a hand held computer, a conventional telephone, or a Wireless Fidelity (Wi-Fi) access point. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 2 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving a plurality of legs;
   combining the plurality of legs into a first service group;
   determining that a number of active user devices corresponding to the plurality of legs increased; and
   switching a portion of the plurality of legs from the first service group to a second service group in response to determining that the number of active user devices corresponding to the plurality of legs increased, wherein switching the portion of the plurality of legs to the second service group further comprises:
      activating the second service group,
      activating an input port associated with the second service group at a Cable Modem Termination System (CMTS),
      activating a quadrature amplitude modulation (QAM) channel associated with the activated input port, and
      automatically licensing the activated QAM channel to a service provider associated with the plurality of legs.

2. The method of claim 1, wherein receiving the plurality of legs comprises receiving the plurality of legs corresponding to respective user device groups.

3. The method of claim 1, wherein receiving the plurality of legs comprises receiving the plurality of legs from at least one receiver.

4. The method of claim 1, wherein receiving the plurality of legs comprises receiving the plurality of legs at a combiner switch.

5. The method of claim 1, wherein combining the plurality of legs into the first service group comprises combining the plurality of legs into the first service group at a combiner switch.

6. The method of claim 1, wherein combining the plurality of legs into the first service group comprises combining the plurality of legs into the first service group when the number of active user devices corresponding to the plurality of legs is below a predetermined threshold.

7. The method of claim 1, wherein combining the plurality of legs into the first service group comprises combining the plurality of legs into the first service group comprising an upstream service group.

8. The method of claim 1, wherein determining that the number of active user devices corresponding to the plurality of legs increased comprises determining that the number of active user devices corresponding to the plurality of legs increased wherein the active user devices comprise cable modems.

9. The method of claim 1, wherein determining that the number of active user devices corresponding to the plurality of legs increased comprises:
   monitoring the plurality of legs to determine the number of active user devices corresponding to the plurality of legs; and
   determining that the number of active user devices corresponding to the plurality of legs is above a predetermined threshold.

10. The method of claim 1, wherein switching the portion of the plurality of legs from the first service group to the second service group comprises switching the portion of the plurality of legs from the first service group to the second service group when the number of active user devices corresponding to the plurality of legs is above a predetermined threshold.

11. The method of claim 1, further comprising notifying the Cable Modem Termination System (CMTS) that the portion of the plurality of legs were switched from the first service group to the second service group.

12. An apparatus comprising:
   a memory storage; and
   a processing unit coupled to the memory storage, wherein the processing unit is operative to:
      determine that a number of active user devices corresponding to a plurality of legs associated with a first service group increased above a predetermined threshold; and
      switch a portion of the plurality of legs from the first service group to a second service group in response to determining that the number of active user devices corresponding to the plurality of legs increased above the predetermined threshold, wherein the processing unit being operative to switch the portion of the plurality of legs to the second service group comprises the processing unit being further operative to:
         activating the second service group,
         activate an input port associated with the second service group at a Cable Modem Termination System (CMTS), activate a quadrature amplitude modulation (QAM) channel associated with the activated input port, and automatically licensing the activated QAM channel to a service provider associated with the plurality of legs.

13. The apparatus of claim 12, wherein the processing unit being operative to determine that the number of active user devices corresponding to the plurality of legs associated with the first service group comprises the processing unit being operative to determine that the number of active user devices corresponding to the plurality of legs associated with the first service group comprising an upstream service group.

14. The apparatus of claim 12, wherein the processing unit being operative to determine that the number of active user devices corresponding to the plurality of legs associated with the first service group comprises the processing unit being operative to determine that the number of active user devices corresponding to the plurality of legs associated with the first service group wherein the user devices comprise cable modems.

15. The apparatus of claim 12, wherein the processing unit being operative to switch the portion of the plurality of legs comprises the processing unit being operative to cause a combiner switch to switch the portion of the plurality of legs from the first service group to the second service group.

16. The apparatus of claim 12, wherein the processing unit is further operative to notify the Cable Modem Termination System (CMTS) that the portion of the plurality of legs were switched from the first service group to the second service group.

17. A non-transitory computer-readable medium that stores a set of instructions which when executed perform a method, the method executed by the set of instructions comprising:

determining that a number of active user devices corresponding to a plurality of legs associated with a first service group increased above a predetermined threshold;

switching a portion of the plurality of legs from the first service group to a second service group in response to determining that the number of active user devices corresponding to the plurality of legs increased above the predetermined threshold, wherein switching the portion of the plurality of legs to the second service group further comprises:

activating the second service group, activating an input port associated with the second service group at a Cable Modem Termination System (CMTS), activating a quadrature amplitude modulation (QAM) channel associated with the activated input port, and automatically licensing the activated QAM channel to a service provider associated with the plurality of legs; and notifying the Cable Modem Termination System (CMTS) that the portion of the plurality of legs were switched from the first service group to the second service group.

18. The non-transitory computer-readable medium of claim 17, wherein determining that the number of active user devices corresponding to the plurality of legs increased comprises determining that the number of active user devices corresponding to the plurality of legs increased wherein the active user devices comprise cable modems.

19. The non-transitory computer-readable medium of claim 17, wherein determining that the number of active user devices corresponding to the plurality of legs associated with the first service group increased above the predetermined threshold comprises determining that the number of active user devices corresponding to the plurality of legs wherein the plurality of legs corresponding to respective user device groups.

20. The non-transitory computer-readable medium of claim 17, wherein determining that the number of active user devices corresponding to the plurality of legs associated with the first service group increased above the predetermined threshold comprises determining that the number of active user devices corresponding to the plurality of legs associated with the first service group comprising an upstream service group.

* * * * *